United States Patent
Schoenen et al.

(10) Patent No.: US 10,306,515 B2
(45) Date of Patent: May 28, 2019

(54) SYSTEM AND METHOD FOR WIRELESS LOAD BALANCING

(71) Applicant: Huawei Technologies Canada Co., Ltd., Kanata (CA)

(72) Inventors: Rainer Schoenen, Hamburg (DE); Ziyang Wang, Kanata (CA); Halim Yanikomeroglu, Ottawa (CA); Nimal Gamini Senarath, Ottawa (CA); Ngoc Dung Dao, Ottawa (CA)

(73) Assignee: Huawei Technologies Canada Co., Ltd., Kanata (CA)

( * ) Notice: Subject to any disclaimer, the term of this patent is extended or adjusted under 35 U.S.C. 154(b) by 0 days.

(21) Appl. No.: 15/497,402

(22) Filed: Apr. 26, 2017

(65) Prior Publication Data
US 2017/0230866 A1  Aug. 10, 2017

Related U.S. Application Data

(63) Continuation of application No. 14/643,636, filed on Mar. 10, 2015, now Pat. No. 9,642,039.
(Continued)

(51) Int. Cl.
*H04M 15/00* (2006.01)
*H04W 4/24* (2018.01)
(Continued)

(52) U.S. Cl.
CPC ....... *H04W 28/08* (2013.01); *H04M 15/8083* (2013.01); *H04M 15/83* (2013.01);
(Continued)

(58) Field of Classification Search
CPC ....... H04W 28/08; H04W 64/00; H04W 4/24; H04M 15/85; H04M 15/8083; H04M 15/83
(Continued)

(56) References Cited

U.S. PATENT DOCUMENTS

| 6,335,927 B1 * | 1/2002 | Elliott | H04L 12/14 370/352 |
| 6,611,500 B1 * | 8/2003 | Clarkson | H04W 16/18 370/252 |

(Continued)

FOREIGN PATENT DOCUMENTS

| CN | 101945398 A | 1/2011 |
| CN | 102065477 A | 5/2011 |
| WO | 0007384 A1 | 2/2000 |

OTHER PUBLICATIONS

Cho, S., et al., "Coverage and Load Balancing in Heterogeneous Cellular Networks with Minimum Cell Separation," IEEE Transactions on Mobile Computing, vol. 13, No. 9, Sep. 2014, pp. 1955-1966.
(Continued)

*Primary Examiner* — William Nealon
(74) *Attorney, Agent, or Firm* — Slater Matsil, LLP

(57) ABSTRACT

In one embodiment, a method of wireless load balancing includes receiving, by a communications controller from a device, a plurality of messages including a plurality of demands of a plurality of UEs and a plurality of locations of the plurality of UEs, where the plurality of demands includes a demand of a UE of the plurality of UEs, where the plurality of locations includes a location of the first UE, and where the location of the UE is in a cell and determining a utility map in accordance with the plurality of demands and the plurality of locations. The method also includes determining a recommendation of user behavior of a user of the first UE in accordance with the utility map, the location of the first UE, and the demand of the UE and transmitting, by the communications controller to the UE, the recommendation of user behavior.

26 Claims, 13 Drawing Sheets

Related U.S. Application Data

(60) Provisional application No. 62/036,801, filed on Aug. 13, 2014.

(51) Int. Cl.
*H04W 64/00* (2009.01)
*H04W 28/08* (2009.01)

(52) U.S. Cl.
CPC ............. *H04M 15/85* (2013.01); *H04W 4/24* (2013.01); *H04W 64/00* (2013.01)

(58) Field of Classification Search
USPC ........................................................ 455/453
See application file for complete search history.

(56) References Cited

U.S. PATENT DOCUMENTS

| | | | | |
|---|---|---|---|---|
| 6,850,764 | B1* | 2/2005 | Patel | H04W 72/0453 455/450 |
| 6,925,066 | B1* | 8/2005 | Chekuri | H04W 24/02 370/203 |
| 7,843,822 | B1* | 11/2010 | Paul | H04L 41/0816 370/230 |
| 8,116,787 | B1* | 2/2012 | Lektuai | H04W 28/18 370/331 |
| 8,185,120 | B2* | 5/2012 | Hassan | H04W 16/14 455/442 |
| 8,331,959 | B2* | 12/2012 | Tomioka | H04W 28/16 455/432.3 |
| 8,625,662 | B2* | 1/2014 | Karaoguz | H04N 21/23439 375/240 |
| 2006/0126532 | A1* | 6/2006 | Binding | H04W 48/18 370/254 |
| 2008/0254812 | A1 | 10/2008 | Kitazoe | |
| 2010/0048172 | A1* | 2/2010 | Karaoguz | H04W 4/02 455/411 |
| 2011/0019627 | A1* | 1/2011 | Krishnaswamy | H04L 12/14 370/329 |
| 2012/0321052 | A1* | 12/2012 | Morrill | H04L 29/06027 379/32.01 |
| 2014/0038634 | A1* | 2/2014 | Eskicioglu | H04W 48/18 455/456.1 |
| 2014/0098670 | A1* | 4/2014 | Choi | H04L 5/00 370/235 |
| 2014/0171079 | A1* | 6/2014 | Yoon | H04W 36/22 455/435.2 |
| 2014/0229210 | A1 | 8/2014 | Sharifian et al. | |
| 2015/0189533 | A1* | 7/2015 | Fehske | H04W 16/18 370/229 |
| 2015/0373613 | A1* | 12/2015 | Harris | H04W 36/22 370/331 |
| 2016/0014648 | A1* | 1/2016 | Hamilton | H04W 36/0083 455/436 |
| 2016/0014793 | A1* | 1/2016 | Klemp | H04W 48/18 370/329 |

OTHER PUBLICATIONS

Dhillon, H., et al., "Load-Aware Modeling and Analysis of Heterogeneous Cellular Networks," IEEE Transactions on Wireless Communications, vol. 12, No. 4, Apr. 2013, pp. 1666-1677.

Schoenen, R., et al., "User-in-the-Loop: Spatial and Temporal Demand Shaping for Sustainable Wireless Networks," IEEE Communications Magazine, Feb. 2014, 8 pgs.

Schoenen, R., "On Increasing the Spectral Efficiency More Than 100% by User-In-The-Control-Loop," 2010 16th Asia-Pacific Conference on Communications (APCC), Oct. 31, 2010-Nov. 3, 2010, 6 pgs.

Schoenen, R., et al., "Economics of User-in-the-Loop Demand Control with Differentiated QoS in Cellular Networks," IEEE PIMRC Conference, Sep. 2012, 6 pgs.

Schoenen, R., et al., "First Survey Results of Quantified User Behavior in User-in-the-Loop Scenarios for Sustainable Wireless Networks," 2012 IEEE Vehicular Technology Conference (VTC Fall), Sep. 2012, 5 pgs.

Schoenen, R., et al., "Green Communications by Demand Shaping and User-in-the-Loop Tariff-based Control," 2011 IEEE Online Conference on Green Communications (GreenCom), Sep. 2011, 6 pgs.

Schoenen, R., et al., "Mobility Aware Users Substantially Boost Spectral Efficiency of Cellular OFDMA Systems," IEEE Communications Letters, vol. 15, No. 5, May 2011, 3 pgs.

Schoenen, R., et al., "Quantified User Behavior in User-in-the-Loop Spatially and Demand Controlled Cellular Systems," 18th European Wireless Conference European Wireless, Apr. 2012, 8 pgs.

\* cited by examiner

SYSTEM AND METHOD FOR WIRELESS LOAD BALANCING

This application is a continuation of U.S. Non-Provisional application Ser. No. 14/643,636 filed on Mar. 10, 2015 and entitled "System and Method for Wireless Load Balancing," which claims the benefit of U.S. Provisional Application Ser. No. 62/036,801 filed on Aug. 13, 2014, and entitled "System and Method for Wireless Load Balancing," both of which applications are hereby incorporated by reference herein as if reproduced in their entireties.

TECHNICAL FIELD

The present invention relates to a system and method for wireless communications, and, in particular, to a system and method for wireless load balancing.

BACKGROUND

In wireless load balancing, highly loaded cells are relieved from the load by offloading some of the load to cells with lighter loads. Load balancing equalizes the traffic demand and real traffic supply to increase fairness among different, for example adjacent cells, which may include, macro cells, small wireless cells, and WiFi cells. In one example, heterogeneous user distributions lead to an increased need for load balancing at busy times, when some cells are lightly loaded and other cells are congested.

In user-in-the-loop (UIL), a user is involved in network access decisions. For example, when a user is receiving a low signal strength, the user may be asked to move to a location where the signal reception is better. The user receives better service, and the communications controller may better serve other users. Temporal and spatial UIL controls may use incentives. In spatial UIL, the user may be guided to a better location within the same cell, for example based on spectral efficiency. In temporal UIL, the user may be instructed to wait for a later time when the network will be less congested.

SUMMARY

An embodiment method of wireless load balancing includes receiving, by a first communications controller from a device, a plurality of messages including a plurality of demands of a plurality of UEs and a plurality of locations of the plurality of UEs, where the plurality of demands includes a first demand of a first UE of the plurality of UEs, where the plurality of locations includes a first location of the first UE, and where the first location of the first UE is in a first cell and determining a utility map in accordance with the plurality of demands and the plurality of locations. The method also includes determining a first recommendation of user behavior of a user of the first UE in accordance with the utility map, the first location of the first UE, and the first demand of the first UE and transmitting, by the first communications controller to the first UE, the first recommendation of user behavior.

An embodiment method of wireless load balancing includes transmitting, by a user equipment (UE) in a first cell to a communications controller, a first location of the UE and a data rate of the UE and receiving, by the UE from the communications controller, a first recommendation of user behavior and a first incentive, where the first recommendation of user behavior is a location or a delay, and where the first recommendation is in accordance with the first location of the UE, and the data rate of the UE and a loading of the first cell.

An embodiment communications controller includes a processor and a non-transitory computer readable storage medium storing programming for execution by the processor. The programming including instructions to receive, from a device, a plurality of messages including a plurality of demands of a plurality of UEs and a plurality of locations of the plurality of UEs, where the plurality of demands includes a first demand of a first UE of the plurality of UEs, where the plurality of locations includes a first location of the first UE, and where the first location of the first UE is in a first cell and determining a utility map in accordance with the plurality of demands and the plurality of locations. The programming also includes instructions to determine a first recommendation of user behavior of a user of the first UE in accordance with the utility map, the first location of the first UE, and the first demand of the first UE and transmit, to the first UE, the first recommendation of user behavior.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

An embodiment load balancing scheme obtains the current loading situation of cells and performs user-in-the-loop (UIL). A time and/or location recommendation may be suggested to a user. The historical load or future load prediction may be taken into consideration in determining the recommendation. The new location and/or time are given to the user. Additionally, the user's mobility information, willingness to move to the new location, and other context information of the user may be considered in making the recommendation. The user may be provided with incentives for accepting the recommendation. Then, the user may decide whether or not to accept the recommendation based on the incentive and the inconvenience.

Both changes in location and time may be suggested to a user. The locations may be located in other communications controllers' coverage areas or in different radio access technologies (RATs).

Figure 1:
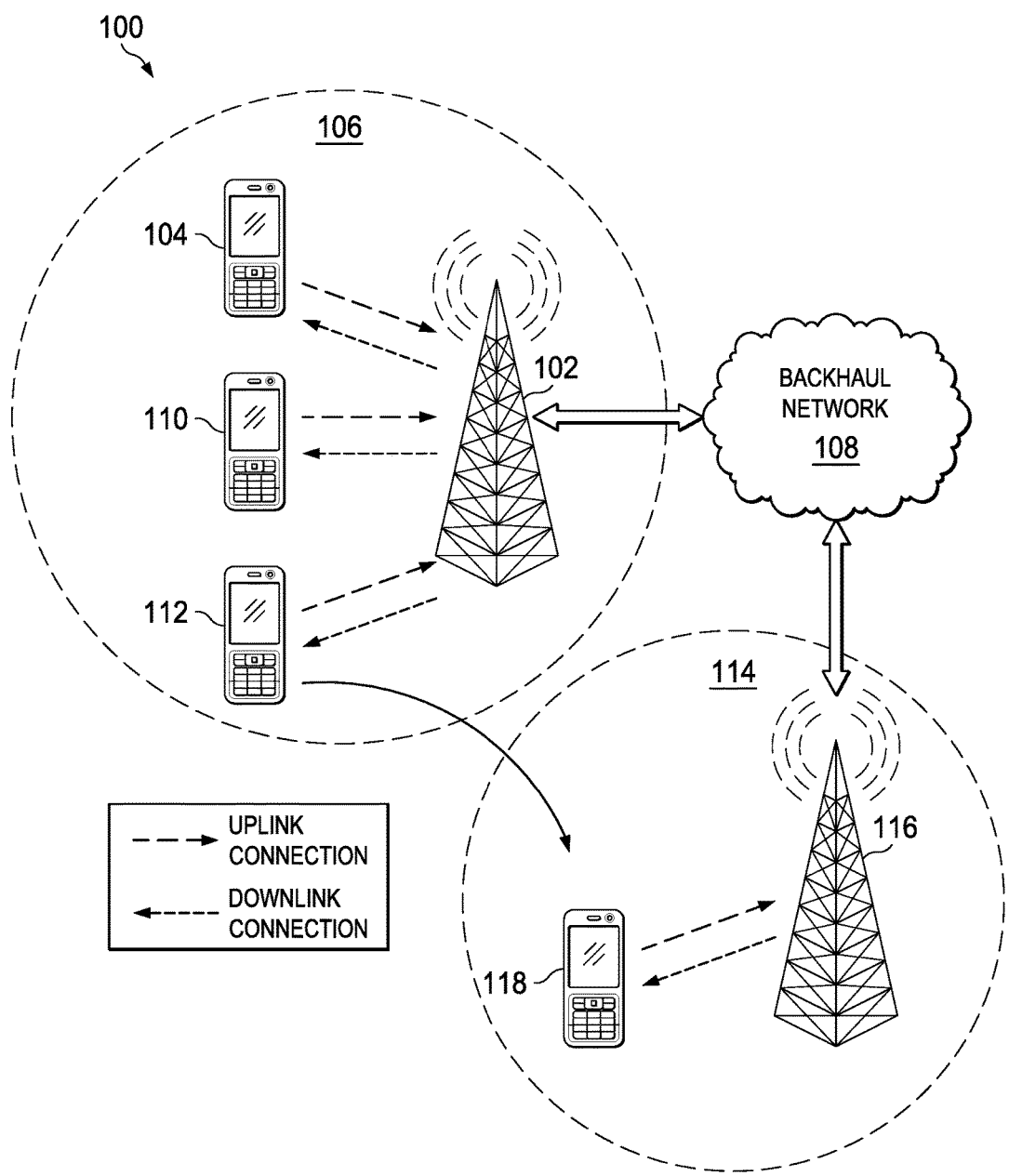
FIG. 1 illustrates a diagram of a wireless network for communicating data.

FIG. 1 illustrates network 100 for communicating data. Network 100 includes communications controller 102 having a coverage area 106 and communications controller 116 having coverage area 114. Communications controller 102 communicates with a plurality of user equipments (UEs), including UEs 104, 110, and 112, and backhaul network 108. Also, communications controller 116 communicates with UE 118 and backhaul network 108. When communications controller 102 is heavily loaded, and communications controller 116 is lightly loaded, a UE, such as UE 112, may be recommended to move from coverage area 106 to coverage area 114. Communications controller 102 and communications controller 116 may be any component capable of providing wireless access by, inter alia, establishing uplink (dashed line) and/or downlink (dotted line) connections with UEs, such as a base station, an enhanced base station (eNB), an access point, a WiFi access point, a picocell, a femtocell, and other wirelessly enabled devices. UEs 104, 110, 112, and 118 may be any component capable of establishing a wireless connection with a communications controller, such as cell phones, smart phones, laptops, tablets, smart cars, sensors, etc. Backhaul network 108 may be any component or collection of components that allow data to be exchanged between communications controllers and a remote end. In some embodiments, the network 100 may include various other wireless devices, such as relays, etc.

A knowledge aided system directs users from heavily loaded cells to lightly loaded cells. Maps, which may be two dimensional or three dimensional, contain statistical data about the spectral efficiency of the cells. The average load situation of the communications controllers may be obtained. The backhaul capacities of the backhauls may be a limiting factor. Additionally, locations of the communications controllers may be also known. The cells may be macro cells, small cells, WiFi cells, light transmitters, or cable networks. Predictions of loads in the cells may also be known, for example based on historical seven day statistics which are Kalman filtered. A utility map indicating suitable recommendations in time and space is determined based the cell loading, cell demand, and conformance likelihood of a user. A user's mobility patterns may be used to determine the utility map. For example, the user's usual path from work to home and time for the commute home may be used to determine locations which are likely to be convenient for the user. The user's willingness and ability to move and/or postpone usage may be known, either generally or specifically to that user. The probability that a user will move is giving by p=f (move distance, postpone time, context). The user specific context may be frequently updated. After a utility map has been calculated, the best locations and times may be found as the local maxima of the map. A global maximum, or several local maxima, may be suggested to a user, along with incentives.

Figure 2:
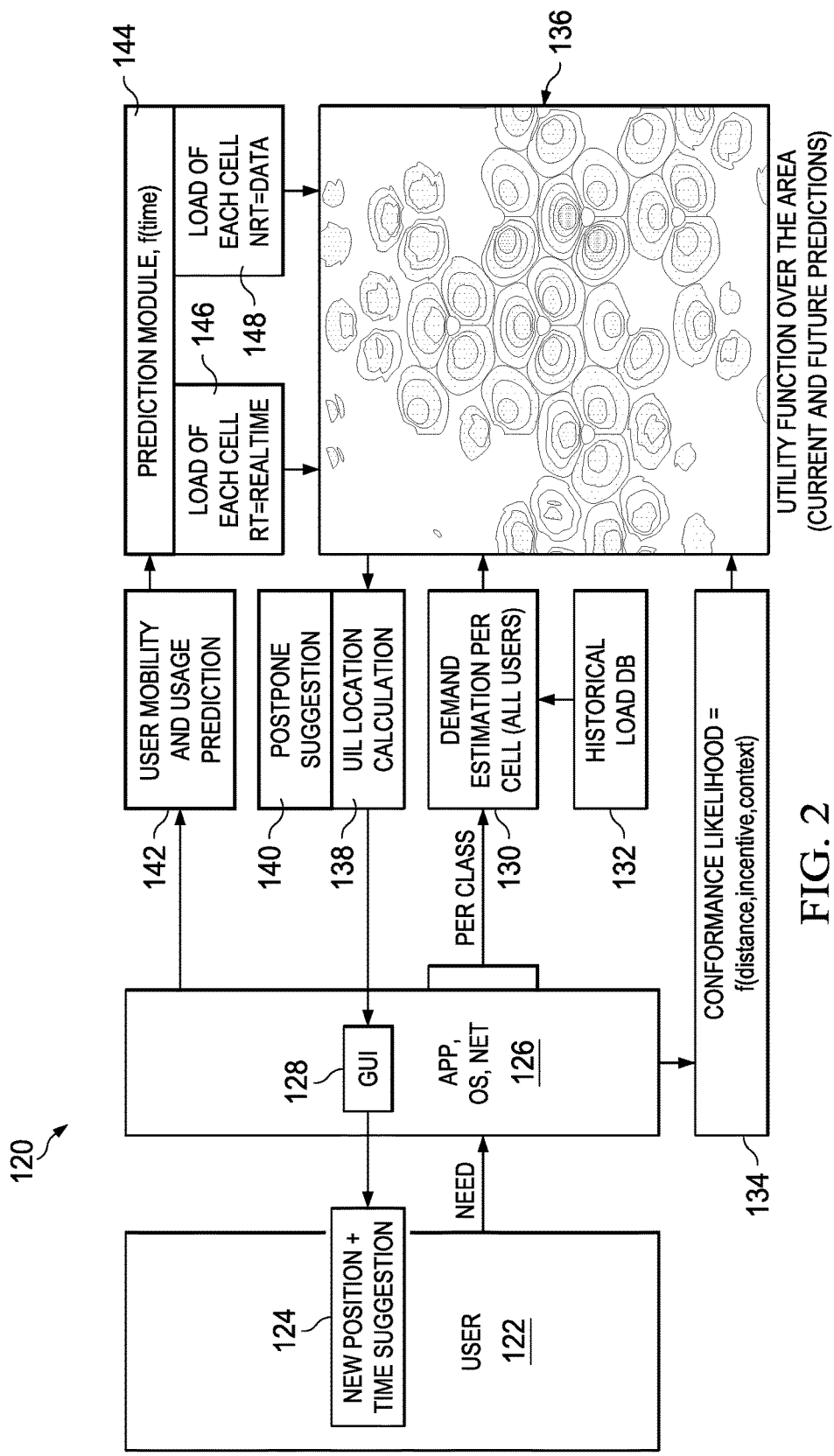
FIG. 2 illustrates an embodiment system for user-in-the-loop (UIL) wireless load balancing.

FIG. 2 illustrates system 120 for wireless UIL load balancing. UE 126, which may be running an application (App) on an operating system (OS) using a networked protocol stack (Net), receives input from user 122. User 122 indicates to UE 126 his network needs, for example by attempting to start an application. This need is transmitted, for example per class, to demand estimation block 130. This information may contain the size of the download in MB, the length of a video to watch and its data rate, or other information from the application context.

Demand estimation block 130 estimates the per cell need for all users. The demand may be based on current demands received from UEs. Historical data may be stored in historical load database (DB) 132. Historical load data may be based on trends over time. For example, demands may peak on the evening weekdays in cells in residential areas, and during the weekday for cells in downtown areas. The demand for the current user is also considered. In one example, the user indicates his demand in advance. Then, the user may be provided with time and location recommendation(s) in advance.

Figure 3:
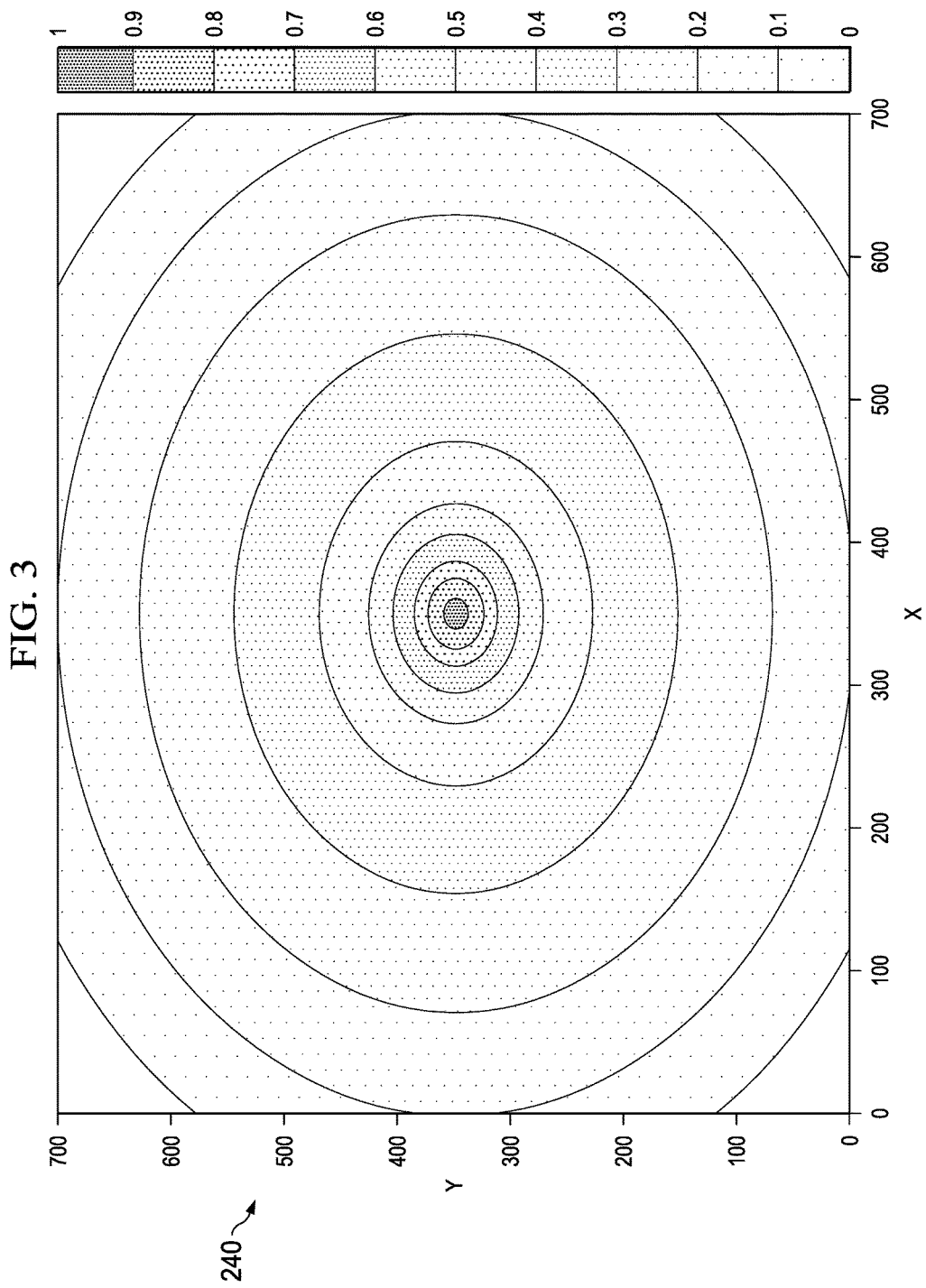
FIG. 3 illustrates a graph of probability of a user moving versus distance.

The conformance likelihood, the likelihood of a user to comply with a recommendation, is determined by conformance likelihood block 134. The conformance likelihood may be a function of distance. For example, a user is more likely to move a small distance than a large distance. The distance for user u to move from point A to point B is given by:

$$|d_u = s_B - s_A|,$$

where $s_A$ is the location of the user at the session start before moving and $s_B$ is the recommended location. The conformance likelihood may decay exponentially with distance. A user may be likely to move from about 10 m to about 100 m. FIG. 3 illustrates map 240 of the probability $p(x, y)$ of a user moving to location x, y. The user is very likely to move a short distance, and less likely to move farther distances. A short distance of 10-100 m may be sufficient to move to a different cell. Macro cells may be 200 m apart, and smaller cells are even smaller. Also, the conformance may be a function of postponing delay. The user may be more likely to delay a short amount of time than a long amount of time. Additionally, the user may be more likely to delay at particular times. For example, a user may be willing to delay from right before work to lunchtime or to right after work, but not willing to delay to the middle of the night. The conformance likelihood may also depend on the incentive. The incentive may be better service, a monetary discount, an increase in data allowance, or another incentive. The greater the incentive, the greater the likelihood that a user will comply with the recommendation.

Additionally, the context of the individual user may be used to determine the conformance likelihood. The history of conformance of this particular user may be used to determine the conformance likelihood. The user may be generally likely to conform or unlikely to conform. In other examples, the user may be likely to conform in certain situations, but not other situations. For example, a user may be likely to conform during commuting times, and unlikely to conform during the work day. User specific context may be collected and received from UE 126. The context may include the application being run, the user's preferences, the user's social connectivity, and other factors. The context may include a variety of features. The user may be known to be immobile, for example in a stadium. A user may be known to pay all penalties and discard all incentives. Users may be given the option to suppress UIL suggestions if the user thinks he will never want to follow the recommendation. An application session may be known to be short lived, and low rate best effort service may be used. The user and application may be postpone intolerant, for example a business call. The connectivity of a user to nearby peers may be considered. A navigation system may guide a user towards a recommended location. Also the availability of navigation systems, for example in a car, may be considered. The context may include whether the demand originates from a child and contain parental restrictions. An application may need stable high rate gold level connectivity, for example emergency videos. Other human, social, and technical aspects may be considered.

The probability that user u with quality of service (QoS) q moves distance $d_u$ with incentive i and the user's context c is given by:

$$p_u(d_u, q, i, c).$$

QoS q may be real time, non-real time, or extensions based on a contract, for example bronze, silver, or gold. The incentive may be information only, a financial bonus or penalty, extra capacity, or top-up for a cap.

Figure 4:
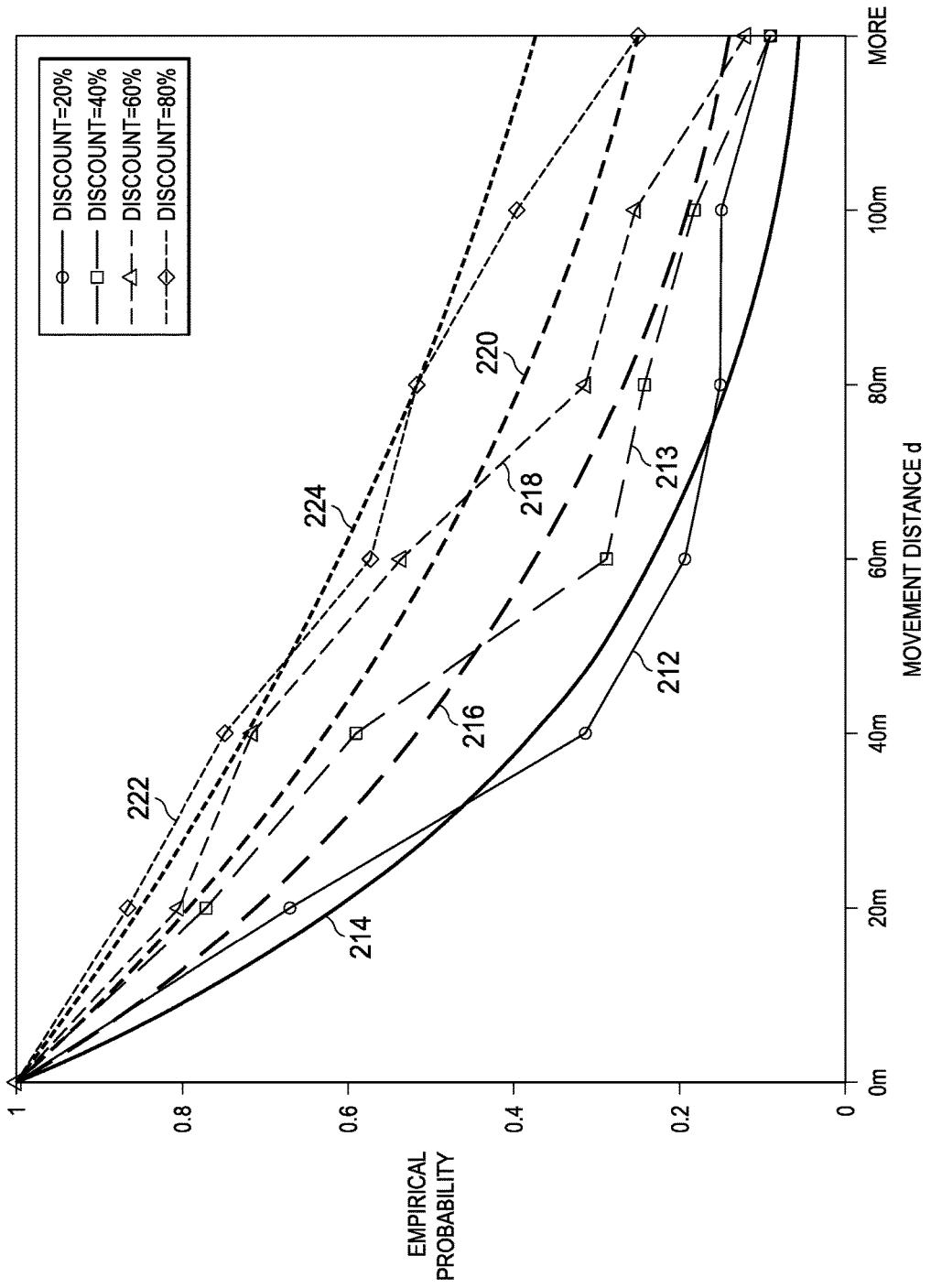
FIG. 4 illustrates a map of the probability of a user moving by location.

FIG. 4 illustrates a graph of the probability of a user moving versus movement distance for various discounts. The graph shows the empirical complimentary cumulative density function (ECDDF) for data applications. For generic cases, curve 214 is the likelihood of moving for a 20% discount, curve 216 is for a 40% discount, curve 220 is for a 60% discount, and curve 224 is for an 80% discount. In a specific example, curve 212 is the probability of moving for a 20% discount, curve 214 is the probability of moving for a 40% discount, curve 218 is the probability of moving for a 60% discount, and curve 222 is the probability of moving for an 80% discount. The curves 214, 216, 220, and 224 show exponential function fits for the empirical data. As the discount increases, the user is more likely to move. Also, users are more likely to move a small distance.

The user's mobility and usage may be predicted in block 142. The user's predicted mobility may be based on the current movement of UE 126. Additionally, the user's predicted mobility may be based on trends of the user based on historical data. For example, a user may commute to work at 8 am, stay at work until 5 pm, and commute home at 5 pm. The user's usage is also predicted. This may be based on the user's current usage and historical usage data from UE 126. For example, the user may have a high usage during the weekend.

Prediction module 144 determines the cell loading based on user mobility and usage prediction from block 142, and the mobility and usage of all UEs in the region. A map of real time and non-real time usage is determined. It may be loaded with real time (RT) data in block 146 and non-real time (NRT) data in 148. The maps contain statistical data about the spectral efficiency of the cells. All cells in the region may be considered. Two dimensional or three dimensional maps with statistical data about the spectral efficiency of cells may be used. In one example, the location dependent signal-to-interference plus noise ratio (SINR) at position s is given by:

$$g(s)=g(x,y).$$

The spectral efficiency, or location dependent mutual information at the new location, is given by:

$$m(s)=m(x,y)=f(g(s)).$$

Figure 5:
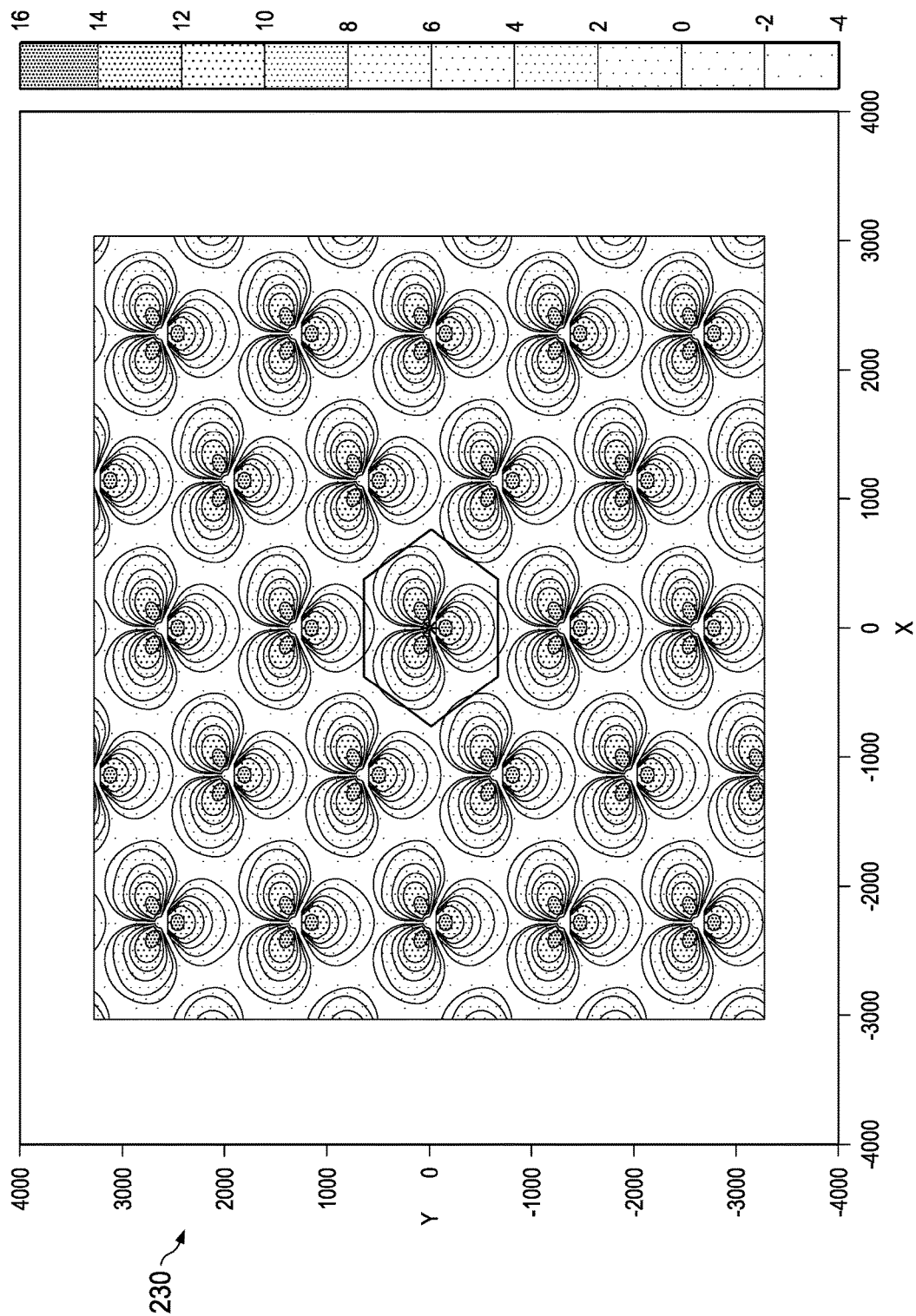
FIG. 5 illustrates a diagram of signal-to-interference plus noise ratio (SINR)

FIG. 5 illustrates map 230 of the SINR and spectral efficiency for the history of previous channel quality indicator (CQI) measurements. The capacity of cell b, which may be limited by the wireless link or backhaul, is c(b). The real time rate demand of user u is $R_u$. The number of real time users in cell b is given by $N_{RT}(b)$, and the number of non-real-time users in cell b is given by $N_{NRT}(b)$. The real time load in cell b is given by:

$$\rho_{RT}(b) = \frac{\sum_u r_{u,RT}}{c(b)}.$$

The locations of UEs in the neighborhood may be known. The load of UEs may be predicted, for example based on historical seven day statistics, Kalman filtered. Also, a WiFi neighborhood map may be used.

The utility function is determined in block 136, which illustrates an example utility function. The utility function is based on the loading of the cells, both in real time and non-real time, the conformance likelihood from demand estimation block 130, and demand estimation per cell from estimation block 130. The conformance likelihood may be multiplied by a function of the load of the cells $(1-\rho_{RT})$ to obtain the utility function. For example, the utility map is a function of location and/or time. An example real time utility function is given by:

$$\text{Utility}_{RT}(u)=p_u*m*(1-\rho_{NT}),$$

and an example non-real time utility function is given by:

$$\text{Utility}_{NRT}(u)=p_u*m*(1-\rho_{PRT})N_{NRT}.$$

The UIL location calculation is determined in block 138. The gain for the network from moving the user to a different cell and location may be considered. One global maximum or multiple local maxima in are determined in the utility function. The suggestion may be to postpone, in block 140, when the suggestion is for a future time. The UIL location and/or time may be transmitted to UE 126, along with incentives. The utility function may be multiplied my $p_{on}$, the probability of staying on during cell switch off (CSO).

Graphical user interface (GUI) 128 of UE 126 displays the recommendation(s) and incentives to user 122. User 122 is free to move to the recommended position and/or time 124. User behavior may include user 122 moving to another position or waiting for a recommended delay. Alternatively, user behavior is automated. For example, UE 126 may delay sessions automatically, for example based on a user setting. In another example, UE 126 waits until it has moved to another cell. UE 126 may be connected to a car, and may wait until the car moves to another cell autonomously. When the user follows the suggestion, he receives the incentive, and has instant gratification. When the user does not follow the suggestion, he does not receive the incentive. UE 126 may monitor the user's compliance, and signal it to the communication controller, which may respond with the incentive. Also, the UE may log whether or not the user complies for historical data. In one example, the GUI contains a soft button. The user indicates whether he accepts the recommendation using the soft button. In another example, the GUI includes a map with the user's current location and recommended location(s). The map may also show routes to the recommended location(s) from the current location. Alternatively, the user replies to a network operator's message. Then, the network may track whether users really move to the recommended location(s). When the user moves, the system reserves radio resources by limiting new service requests. For example, other new video calls are prevented from taking the resources in the recommended cell the user has moved to.

In one example, a user wants to download a heavy volume. The system knows the user's habits and predicted locations. The user works from 9:00 am until 5:00 pm during the week. The user's predicted usage and trajectory from 5:00 pm until 7:00 pm are also known. For example, the user may go to a particular coffee shop at 5:15 pm on his way home. The user may receive some suggested alternatives. One alternative is to download now, with a discouraging incentive, such as a higher price or throttled down speed. Another alternative is to move to a nearby new location in another cell with a smaller load and better spectral efficiency. Alternatively, the user may be offered a suggestion to download at a later time, for example at home.

In another example, a young adult wants to watch a high definition video, and the serving cell is congested. The system knows the users preferred hang out locations and his load status. The system provides several options to the user. Usage may now be prohibited based on the data plan setup, to avoid a bill shock to the user's parents. Watching at one of the user's preferred places and times may be suggested, for example at a friend's house. The system may determine the order of suggested locations and time. An option to watch the video with lower quality may also be recommended.

Figure 6:
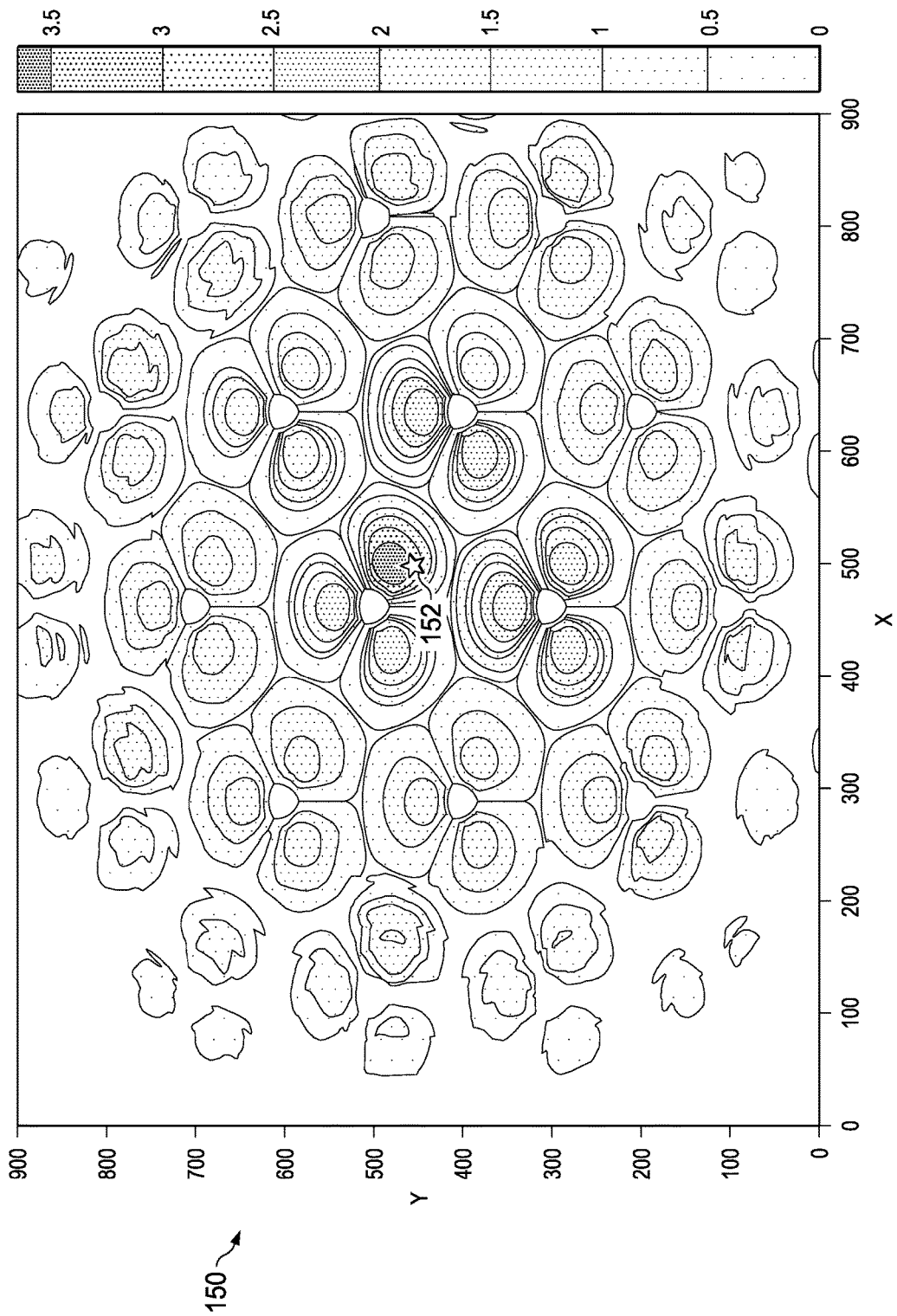
FIG. 6 illustrates a map of spectral efficiency times the probability of moving.

FIG. 6 illustrates map 150 with the utility of locations for user 152 as a graph of the spectral efficiency, in bit/s/Hz, times the UIL move likelihood with macro cells. In this example, the suggestions are all within the same cell, and the user is already in a good location.

Figure 7:
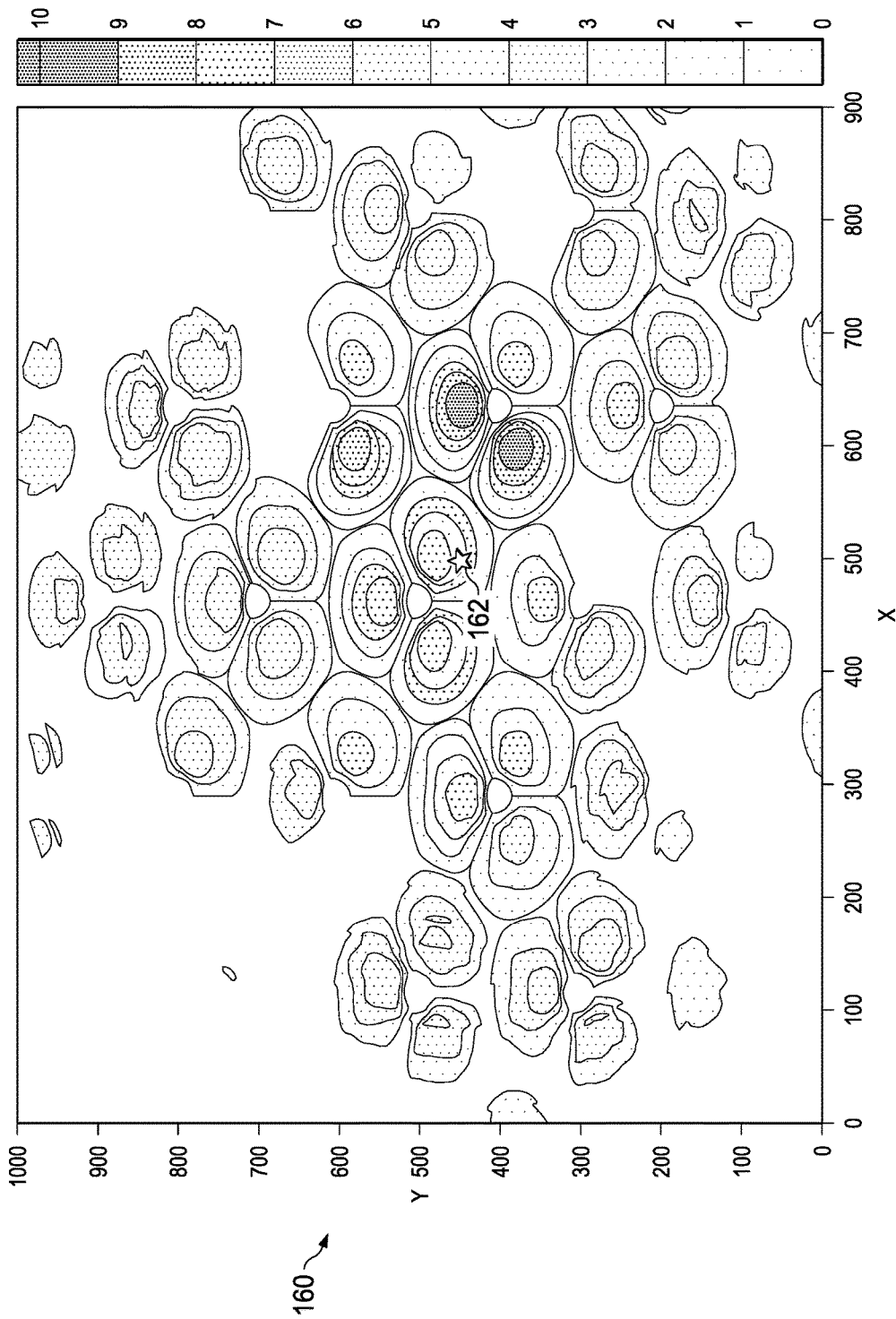
FIG. 7 illustrates a map of spectral efficiency times the probability of moving times the load utility.
Figure 8:
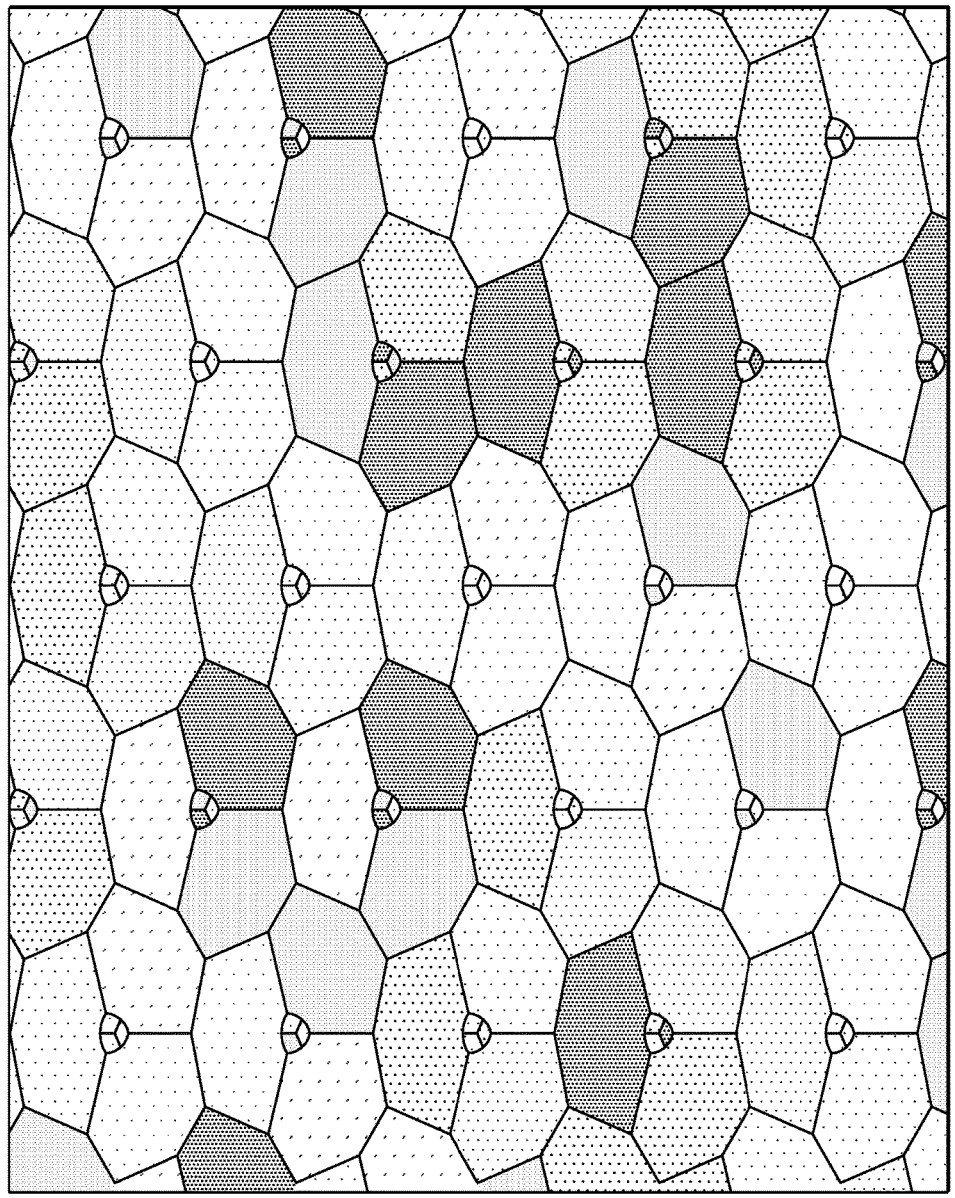
FIG. 8 illustrates a load utility map.

FIG. 7 illustrates map 160 of the utility of locations for user 162. The map shows the spectral efficiency in bit/s/Hz times the UIL move likelihood times the load utility, also with macro cells. FIG. 8 illustrates load utility map 170. In this example, the loads of the cells are unbalanced, and the user may receive recommendations to move to one of the neighboring cells to the right of the user.

Figure 9:
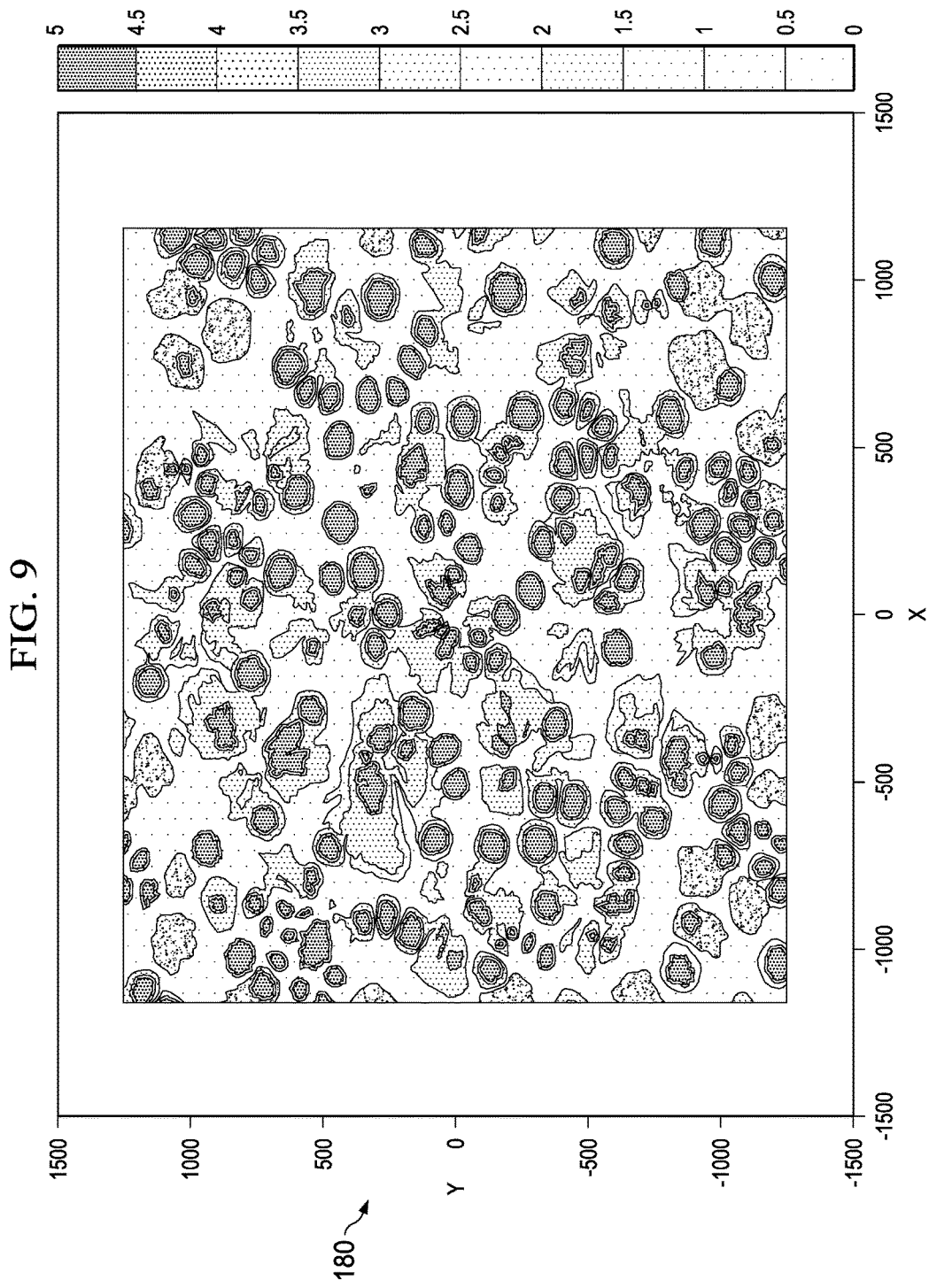
FIG. 9 illustrates an additional spectral efficiency map with small cells.

In another example, illustrated by map 180 in FIG. 9, the spectral efficiency in an urban macro (UMa) system with small cells is shown. The pattern is irregular due to small cells.

Figure 10:
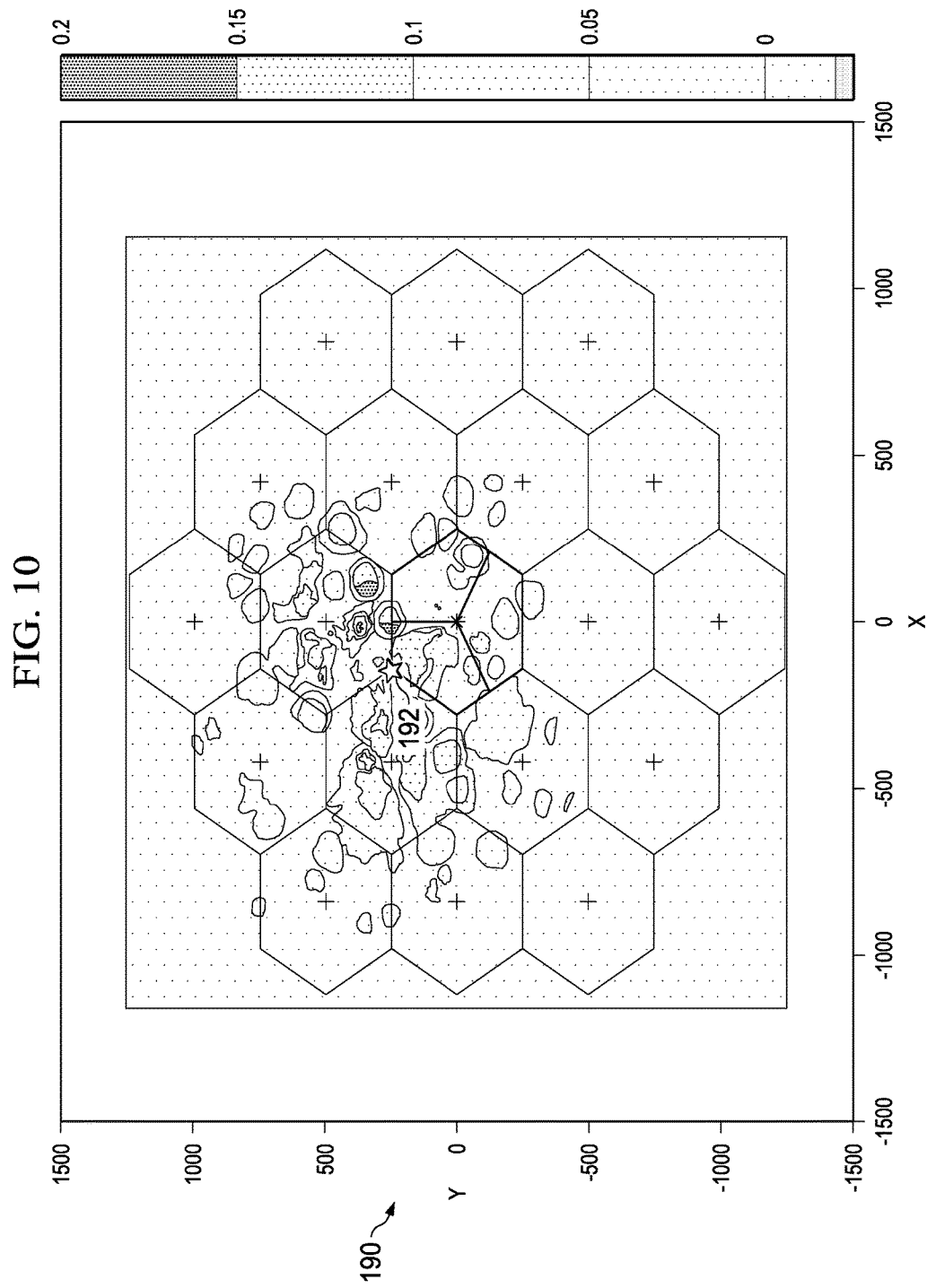
FIG. 10 illustrates a utility map with macro cells and small cells.

FIG. 10 illustrates utility map 190 with user 192. The spectral efficiency, in bit/s/Hz, which is illustrated in FIG. 9, times the UIL conformance probability times the load utility is pictured. In this example, there are unbalanced loads, and it may be recommended that the user moves to a neighboring cell. For example, it may be suggested that user 192 move to the right, or down and to the left, to neighboring small cells. In this example, the neighboring macro cells are congested.

Figure 11:
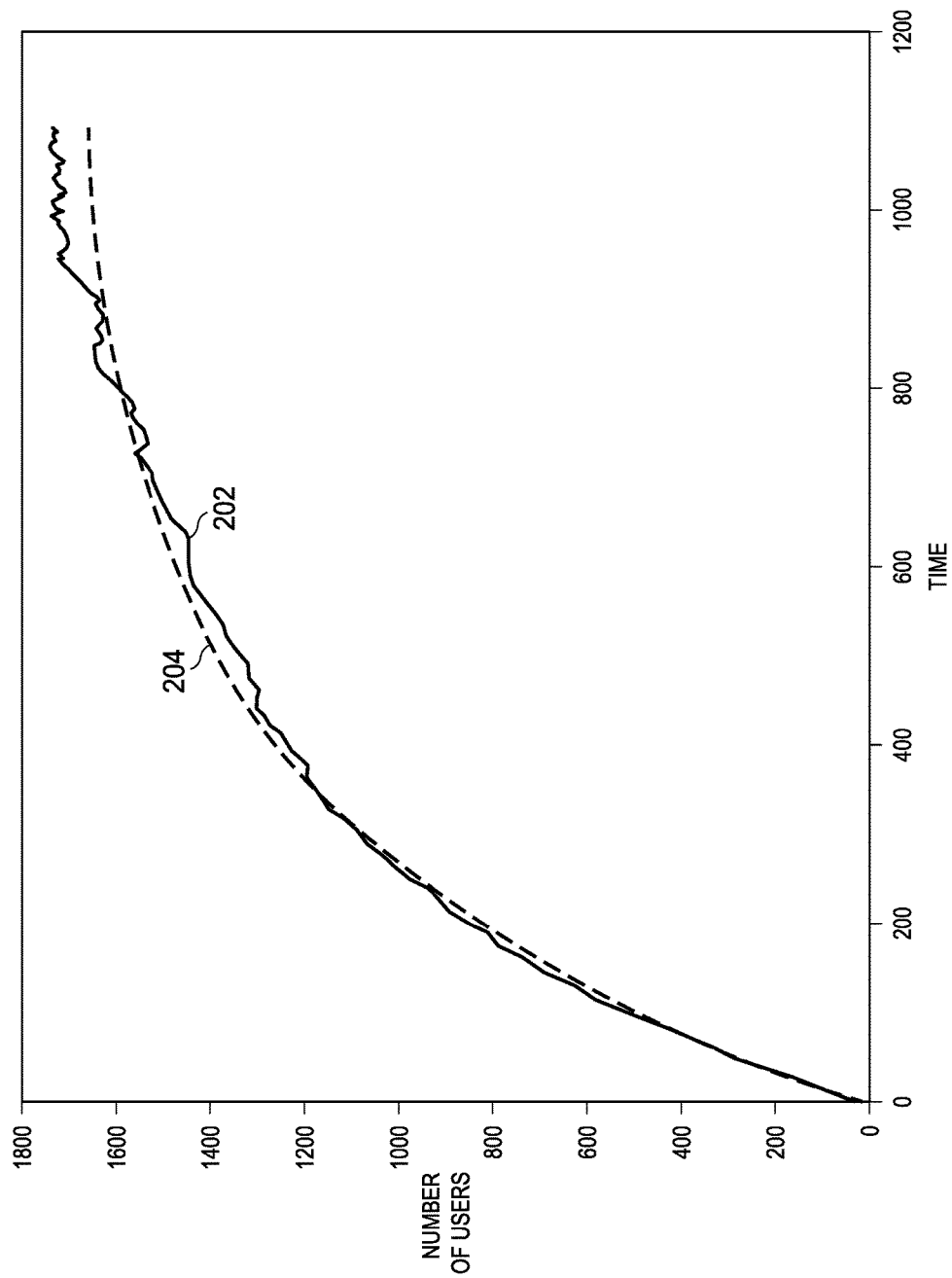
FIG. 11 illustrates a graph of the number of users versus time in a birth death process.

In a stationary example of UIL with wireless load balancing, there is one state vector per cell. This state vector contains the number of active users, for both real time and non-real time traffic applications. The state vector also contains the demand rate of the sum of the real time flows. Additionally, the spectral efficiency and capacity of the wireless link and the backhaul capacity of the Internet connection are stored in the state vector. The information from the current time may be used to make a future prediction. When a new user enters a cell, the location vector and average spectral efficiency is known. When a newly active user starts a session over a certain size, for example more than 1 MB of data, classical load balancing, such as handovers and cell biasing, will have already been applied. If the user has not already been UIL instructed, he receives a location recommendation. This location recommendation considers the current load of the cell, both for real time and non-real time traffic. The new location may be in another cell with a lower load, in the same cell at a location with better spectral efficiency, or in another cell which is permanently on, if the current cell is switched off, for example during off-peak hours. In this example, users who have already received UIL recommendations do not receive additional suggestions. One new user starts a session at a time. The process may be birth-death type, such as a Poissonian process, for example having negative exponential session durations over time. The stationary situation is reached by new active users appearing and other users disappearing after their sessions end. After a few average session lengths, uncontrolled starting points converge to the controlled stationary state. FIG. 11 illustrates a graph of the number of users versus time for the stationary state. Curve 202 shows the number of actual users, and curve 204 shows estimated users. The transient state may be observed. Considering multiple users at a time may speed up reaching the stationary state. When the average relocation time is larger than the average inter-session time per cell, on average more than one user is in transition. When more than one user is in transition, overshoot and oscillations of cell network loads may be avoided, for example by using thresholds to avoid relocation recommendations for minor gains. One example iterative considers one user at a time. For example, UIL is performed when a user starts a session, or when his data use first exceeds a threshold. In another example, multiple users are considered at a time.

Figure 12:
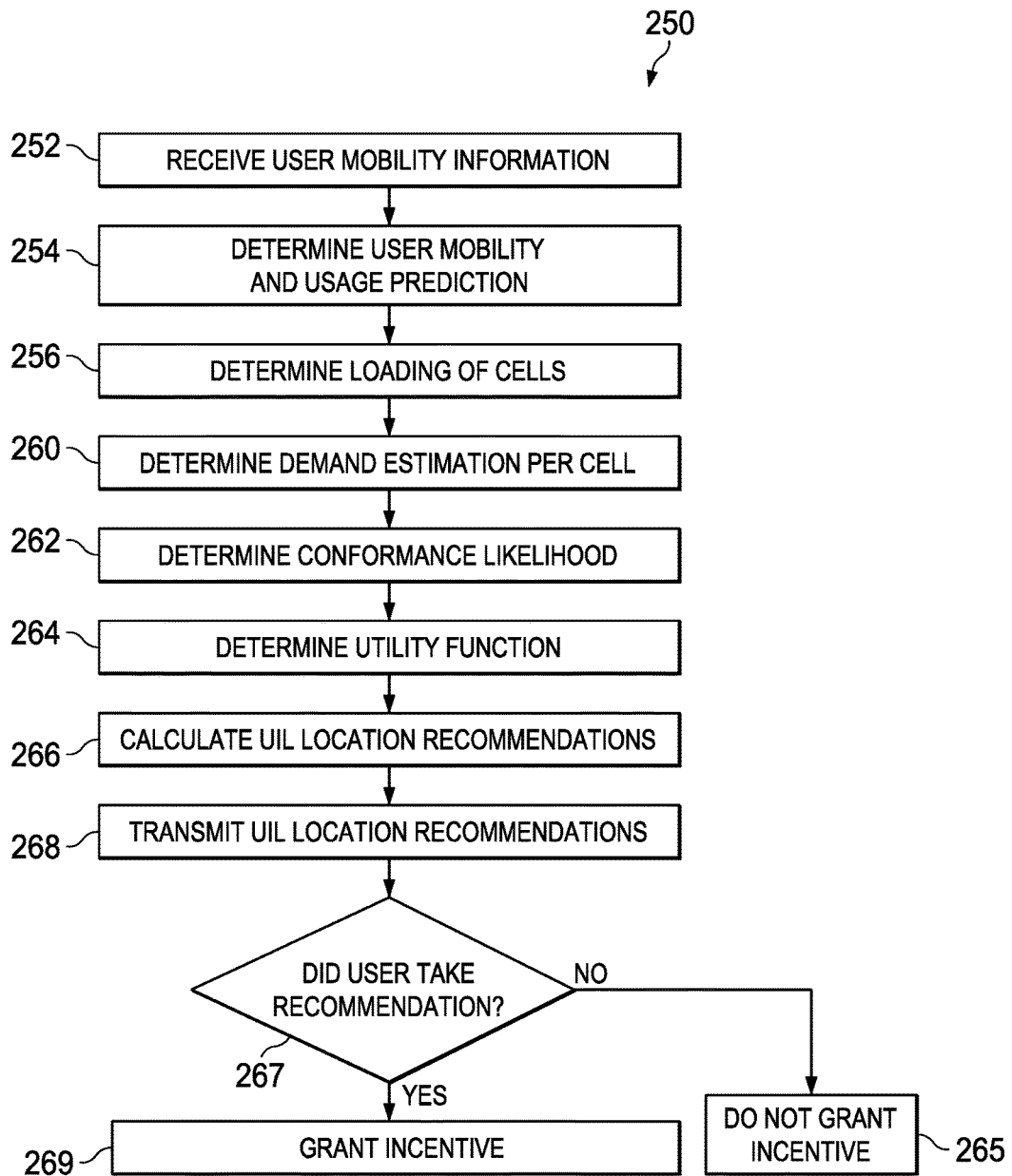
FIG. 12 illustrates a flowchart of an embodiment method of UIL wireless load balancing performed by a communications controller.

FIG. 12 illustrates flowchart 250 for a method of UIL wireless load balancing performed by a communications controller. The steps may be performed in a different order, and some functions may operate concurrently. Initially, in step 252, the communications controller receives user mobility and usage information from UEs. In one example, the information is received periodically. In another example, the information is received when the UE accesses the network. This information may be received from signal path triangulation, global positioning system (GPS) information, or indoor navigation systems. This information may include whether the UEs are moving and the data rate of downloads and/or uploads for the UEs. Mobility information may also include that the UE is stationary or that the UE is in a car and limited to streets. Also, the velocity and trajectory may be known. Historical data on mobility and/or usage may also be received from the UEs. Information may be received from the UEs and from other communications controllers. In one example, the user's destination and/or path may be known, for example based on a mapping application.

Then, in step 254, the communications controller determines the user mobility and usage prediction for a particular user. The user's predicted mobility may be based on the current movement of the received in step 252. Additionally, the user's predicted mobility may be based on trends of the user based on historical data. The user's usage is also predicted. This may be based on the user's current usage and historical usage data from the UE. For example, the user may have a high usage on the weekend.

Next, in step 256, the communications controller determines the loading of cells as a function of time. This is based on user mobility and usage prediction from step 254, and for the mobility and usage of other UEs in the region. A map of usage, both in real time and non-real time, is determined. All cells in the region may be considered. For example, macro cells, small cells, and WiFi cells may be considered. Two dimensional or three dimensional maps with statistical data about the spectral efficiency of stations may be used. In one example, the location dependent signal-to-interference plus noise ratio (SINR) at position s is given by:

$$g(s)=g(x,y).$$

The spectral efficiency, or location dependent mutual information at the new location, is given by:

$$m(s)=m(x,y)=f(g(s)).$$

The capacity of cell b, which may be limited by the wireless link or backhaul, is c(b). The real time rate demand of user u is $R_u$. Also, the number of real time users in cell b is given by $N_{RT}(b)$, and the number of non-real-time users in cell b is given by $N_{NRT}(b)$. The real time load in cell b is given by:

$$\rho_{RT}(b) = \frac{\sum_u r_{u,RT}}{c(b)}.$$

The locations of communications controllers in the neighborhood may be known. The load of communications controllers may be predicted, for example based on historical seven day statistics, Kalman filtered.

Based on the users' demand, the communications controller determines the demand estimation per cell in step 260. The demand estimation may be done per cell for all users. Also, historical data may be retrieved from a historical load database, which may be based on trends over time.

In step 262, the communications controller determines the conformance likelihood of a particular user. The conformance likelihood may be a function of distance. For example, a user is more likely to move a small distance than a large distance. The distance for user u to move from point A to point B is given by:

$$d_u=|s_B-s_A|,$$

where $s_A$ is the location of the user at the session start before moving, and $s_B$ is the proposed location to move to. The conformance likelihood may decay exponentially with distance. Additionally, the conformance may be a function of delay. The user may be more likely to delay a short amount of time than a long amount of time. The user may be more likely to delay at particular times. For example, a user may be willing to delay from right after work to later in the evening. The conformance likelihood may also depend on the incentive. The incentive may be better service, a monetary discount, an increase in data allowance, or another incentive. The greater the incentive, the greater the likelihood that a user will conform. Additionally, the context of the individual user may be used to determine the conformance likelihood. The history of conformance of this user may be used to determine the conformance likelihood. User specific context may be received from the UE. The context may include the application being used, the user's preferences, and the user's social connectivity. The probability that user u with quality of service (QoS) q moves distance $d_u$ with incentive i and the user's context c is given by:

$$p_u(d_u,q,i,c).$$

QoS q may be real time, non-real time, or extensions based on a contract, for example bronze, silver, or gold. The incentive may be information only, a financial bonus or penalty, extra or reduced capacity, or top-up for a cap.

In step 264, the utility function is determined. The utility function is based on the loading of the cells, both in real time and non-real time, the spectral efficiency utility (m), the conformance likelihood from step 262, and demand estimation per cell from step 260. The conformance likelihood ($p_u$) may be multiplied by a function of the load of the cells (1-$\rho_{RT}$) to obtain the utility function. The utility map may be a function of location and/or time. In one example, the real time utility function is given by:

$$\text{Utility}_{RT}(u)=p_u*m*(1-\rho_{RT}),$$

and the non-real time utility function is given by:

$$\text{Utility}_{NRT}(u)=p_u*m*(1-\rho_{RT})/N_{NRT}.$$

Next, in step 266, the communications controller calculates UIL location recommendations. One global maximum or multiple local maxima of the utility function are determined. The recommendation may be to postpone when the suggestion is for a future time. In one example, the recommendation is a transmission parameter, such as a specified power for the user transmission, a specific waveform, a specific access link and/or a specific network. In an additional example, the recommendation is a transmission duration. Alternatively, the recommendation is a location to which the user moves. The recommendation may include one or more aspect. For example, a recommendation may be for the user to move to a particular location and wait a delay. In another example, the recommendation is to wait a delay and then transmit information for a specified period of time. Other combinations may be used. For example, the user may be asked to move to a location, wait for a delay, and use a specific transmission parameter.

The utility function may be multiplied my $p_{on}$, the probability of staying on during cell switch off (CSO), i.e., the intentional out-of-operation of a cell with the intent to save energy costs, e.g., during off-peak and night times.

In step 268, the communications controller transmits user behavior, such as one or more UIL location and/or time suggestion to the UE, along with incentives. The user behavior may be automated. For example, the UE may delay sessions automatically, for example based on a user setting. In another example, the UE waits until it has moved to another cell. The UE may be connected to a car, and may wait until the car moves to another cell autonomously.

Then, in step 267, the communications controller determines whether the user has taken the recommendation. For example, the communications controller may receive a message indicating that the UE has moved to a recommended location. In another example, the communications controller determines that the user halts activity, and resumes activity at the recommended time. The communications controller may determine that the user has not complied with any recommendations when the UE continues its behavior. When the communications controller determines that the user has complied with a recommendation, it grants the corresponding incentive in step 269. When the communications controller determines that the user has not complied with a recommendation, it does not grant an incentive, or applies a negative incentive, in step 265.

Figure 13:
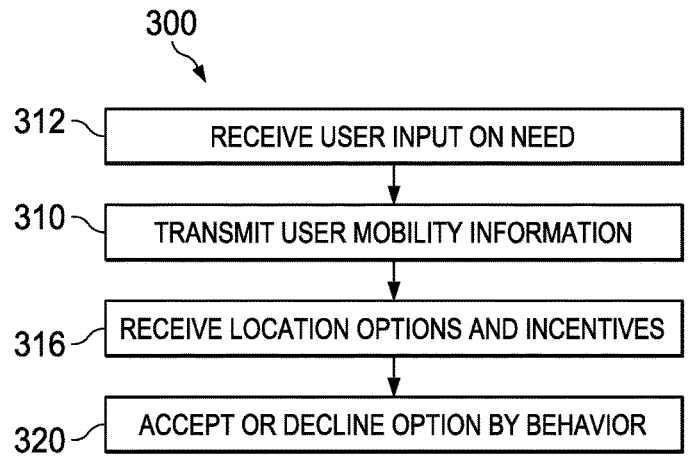
FIG. 13 illustrates a flowchart of an embodiment method of UIL wireless load balancing performed by a user equipment (UE)

FIG. 13 illustrates flowchart 300 for a method of UIL wireless load balancing performed by a UE. Initially, in step 312, the UE receives input from the user. For example, the user opens an application.

Then, in step 310, the UE transmits mobility information to a communications controller. The UE may transmit its current mobility, historical mobility information, its current usage, historical usage, or other information, such as per class demand.

In step 316, the UE receives location and/or time recommendation(s) from the communications controller. The UE may receive one location recommendation, along with an associated incentive. The recommended location may be in another cell. In another example, the UE receives several location recommendations and associated incentives. The incentives may be the same, or they may be different. For example, a more heavily preferred recommendation may have a stronger incentive. The UE may receive one delay recommendation, along with an incentive. In an additional example, the UE receives more than one delay recommendation, or both time recommendation(s) and location recommendation(s). The UE displays the location and/or delay recommendation(s), along with accompanying incentives.

Finally, in step 320, the user either accepts one or more time or location recommendation(s). The user accepts a location recommendation by moving to the location. Similarly, the user accepts a time recommendation by delaying use to the suggested time. A user declines the recommendations by continuing his current usage.

In an embodiment, the spectral efficiency, and thus the total throughput due to spatial UIL is increased. Heterogeneity in terms of users per cell may be decreased. In one embodiment, there is a more balanced load of traffic among cells, reducing congestion and the risk of session blocking. Load balancing, measured by deviations from the average or a Jain fairness index, may be improved. A load may be adjusted to the actual capacity limited by the spectral efficiency and backhaul. In an example, there is a low probability of blocking or session overload by reducing spatial peaks.

Figure 14:
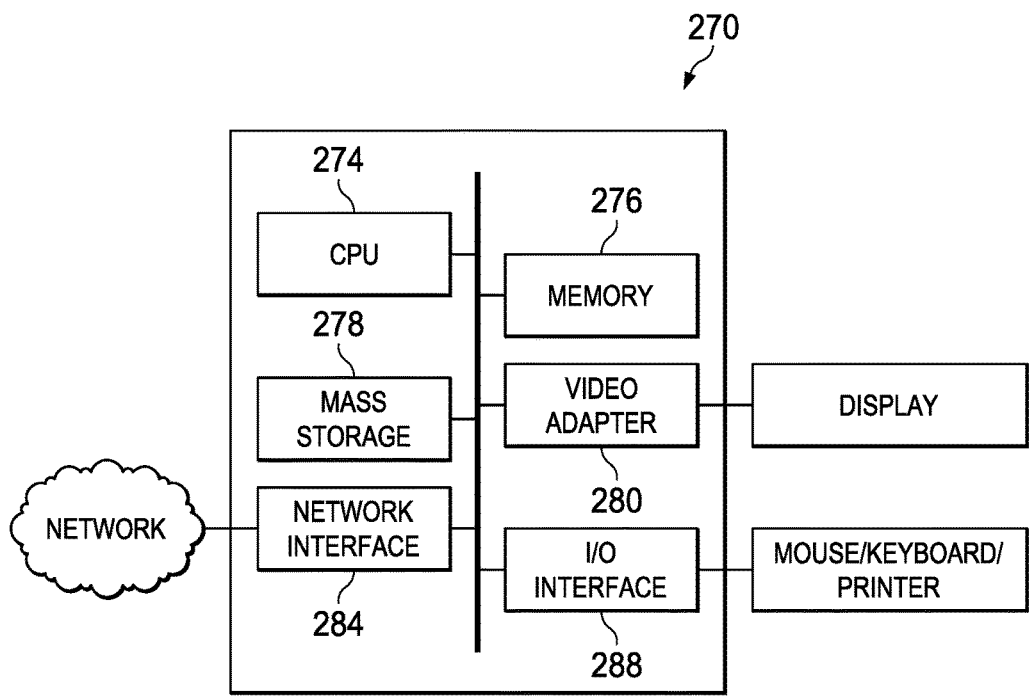
FIG. 14 illustrates a block diagram of an embodiment general-purpose computer system.

FIG. 14 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adapter 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of non-transitory storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of wireless network load balancing, the method comprising:
receiving, by a communications controller of a first cell, a demand of a user equipment (UE), and a first location of the UE in the first cell;
requesting, by the communications controller, loading information for the first cell and at least one neighboring cell of the first cell;
generating, by the communications controller, a recommendation comprising an incentive for a user of the UE, and at least one of: a time period for which communications from the UE are postponed; or a second location for the UE for communications, the second location being different from the first location, the recommendation being based on the loading information for the first cell and the at least one neighboring cell, and a utility map generated by the communications controller indicating suitable recommendations for the user of the UE, and wherein the at least one of the time period or the second location included in the recommendation is a maxima of the utility map within a region that surrounds the first location;
transmitting, by the communications controller, the recommendation to the UE; and
receiving, by the communications controller, a response to the recommendation.

2. The method of claim 1, wherein the recommendation is further based on the demand of the UE and the first location of the UE.

3. The method of claim 1, wherein the incentive is at least one of:
a discount in a cost of a service;
an improvement in quality of service; or
an increase in a data allowance.

4. The method of claim 1, wherein the response comprises a message indicating that the UE has moved to the second location.

5. The method of claim 1, further comprising:
receiving, by the communications controller, a request from the UE indicating a willingness and an ability of the UE to move to a different location.

6. A communications controller comprising:
a non-transitory memory storage comprising instructions; and
one or more processors in communication with the non-transitory memory storage, wherein the one or more processors execute the instructions to:
receive a demand of a user equipment (UE) and a first location of the UE in a first cell;
request loading information for the first cell and at least one neighboring cell of the first cell;
generate a recommendation comprising an incentive for a user of the UE and at least one of: a time period for which communications from the UE are postponed; or a second location for the UE for communications, the second location being different from the first location,
the recommendation being based on the loading information for the first cell and the at least one neighboring cell, and a utility map generated by the communications controller indicating suitable recommendations for the user of the UE, wherein the at least one of the time period or the second location included in the recommendation is a maxima of the utility map within a region that surrounds the first location;
transmit the recommendation to the UE; and
receive from the UE a response to the recommendation.

7. The communications controller of claim 6, wherein the recommendation is further based on the demand of the UE and the first location of the UE.

8. The communications controller of claim 6, wherein the incentive is at least one of:
a discount in a cost of a service;
an improvement in quality of service; or
an increase in a data allowance.

9. A method of wireless network load balancing, the method comprising:
receiving, by a first communications controller of a first cell, first context information of a first user equipment (UE) in the first cell;
generating, by the first communications controller, a utility map based on loading information for the first cell and the first context information, the utility map indicating suitable recommendations for the UE;
determining, by the first communications controller, a recommendation including a recommended UE behavior in accordance with a maxima of the utility map, the recommended UE behavior including at least one of: postponing communications from the UE for a time period; or receiving information from the first communications controller or a second communications controller after moving to a location different from a current location of the UE, at least one of the time period or the location is the maxima of the utility map within a region that surrounds the current location; and
transmitting, by the first communications controller, the recommendation to the first UE.

10. The method of claim 9, wherein the recommended UE behavior further includes at least one of:
the first UE receives information from the first communications controller with a level of quality different from a current level of quality; or
the first UE receives information from the first communications controller at a payment rate different from a current payment rate.

11. The method of claim 9, wherein the first context information comprises at least one of:
usage information indicative of a communication need of the first UE;
location information indicative of a current location of the first UE;
current mobility information related to the first UE;
information indicative of a likelihood of the first UE accepting an offer;
information indicative of a likelihood of the first UE moving to a particular place at a particular time;
historical location information of the first UE;
historical mobility information of the first UE; and
historical network usage information of the first UE.

12. The method of claim 9, wherein the recommendation further comprises an incentive for the recommended UE behavior.

13. The method of claim 12, wherein the incentive is at least one of:
a discount in a cost of a service;
an improvement in quality of service; or
an increase in a data allowance.

14. The method of claim 9, wherein the utility map is a function of both a location and a time.

15. The method of claim 14, wherein the location is within a coverage area of the first cell.

16. The method of claim 14, wherein the utility map is further based on loading information for at least one neighboring cell of the first cell, and wherein the location is within a coverage area of the first cell and the at least one neighboring cell.

17. The method of claim 9, further comprising receiving second context information of a second UE different from the first UE, wherein the utility map is further based on the second context information.

18. A first communications controller comprising:
a non-transitory memory storage comprising instructions; and
one or more processors in communication with the non-transitory memory storage, wherein the one or more processors execute the instructions to:
receive first context information of a first user equipment (UE) in a first cell;
generate a utility map based on loading information for the first cell and the first context information, the utility map indicating suitable recommendations for the UE;
determine a recommendation including a recommended UE behavior in accordance with a maxima of the utility map, the recommended UE behavior including at least one of: postponing communications from the UE for a time period; or receiving information from the first communications controller or a second communications controller after moving to a location different from a current location of the UE, at least one of the time period or the location is the maxima of the utility map within a region that surrounds the current location; and
transmit the recommendation to the first UE.

19. The first communications controller of claim 18, wherein the recommended UE behavior further includes at least one of:
the first UE receives information from the first communications controller with a level of quality different from a current level of quality; or
the first UE receives information from the first communications controller at a payment rate different from a current payment rate.

20. The first communications controller of claim 18, wherein the utility map is a function of both a location and a time.

21. The first communications controller of claim 20, wherein the utility map is further based on loading information for at least one neighboring cell of the first cell, and wherein the location is within a coverage area of the first cell and the at least one neighboring cell.

22. The method of claim 1, wherein the maxima of the utility map is a local maxima of the utility map.

23. The method of claim 1, wherein the maxima of the utility map is a global maxima of the utility map.

24. The method of claim 1, wherein the recommendation further comprises a utility map indicating a plurality of recommended locations.

25. The method of claim 24, wherein the recommendation is displayed in a graphical user interface (GUI) of the UE after being received by the UE.

26. The method of claim 1, wherein the second location is within the at least one neighboring cell.

* * * * *